(12) United States Patent
Kacines

(10) Patent No.: US 9,062,815 B2
(45) Date of Patent: Jun. 23, 2015

(54) ROTATIONAL ADJUSTER FOR ITEM WITH A HANGING LOOP

(71) Applicant: Jeffery J. Kacines, Allen, TX (US)

(72) Inventor: Jeffery J. Kacines, Allen, TX (US)

(*) Notice: Subject to any disclaimer, the term of this patent is extended or adjusted under 35 U.S.C. 154(b) by 285 days.

(21) Appl. No.: 13/837,626

(22) Filed: Mar. 15, 2013

(65) Prior Publication Data

US 2014/0082893 A1 Mar. 27, 2014

Related U.S. Application Data

(60) Provisional application No. 61/744,334, filed on Sep. 24, 2012.

(51) Int. Cl.
| A47G 29/00 | (2006.01) |
| F16M 13/02 | (2006.01) |
| F16M 11/12 | (2006.01) |
| A47G 33/10 | (2006.01) |

(52) U.S. Cl.
CPC .............. *F16M 13/02* (2013.01); *F16M 11/12* (2013.01); *F16M 13/027* (2013.01); *A47G 33/10* (2013.01); *Y10T 24/3936* (2015.01)

(58) Field of Classification Search
CPC ...... A47G 29/083; A47G 33/10; F16G 11/12; F21V 21/008
USPC .......................................... 248/693, 493, 495
See application file for complete search history.

(56) References Cited

U.S. PATENT DOCUMENTS

| 716,609 | A | * | 12/1902 | Worsnop ..................... 24/135 R |
| 815,422 | A | * | 3/1906 | Gregory ......................... 248/328 |
| 913,125 | A | * | 2/1909 | Greene ........................... 248/493 |
| 1,057,484 | A | * | 4/1913 | Huber ........................... 24/135 N |
| 1,272,272 | A | * | 7/1918 | Kell ............................. 24/129 A |
| 1,545,889 | A | * | 7/1925 | Everson ....................... 24/136 R |
| 2,533,731 | A | * | 12/1950 | Gomberg ....................... 242/129 |
| 2,785,503 | A | * | 3/1957 | Schaefer ....................... 446/227 |
| 4,150,798 | A | * | 4/1979 | Aragon ....................... 242/388.1 |
| 4,290,171 | A | * | 9/1981 | Wilcox .............................. 24/18 |
| 4,693,031 | A | * | 9/1987 | Koetje ........................... 43/44.91 |
| 4,726,536 | A | * | 2/1988 | Lerner et al. ............... 242/388.1 |
| 4,805,334 | A | * | 2/1989 | Barclay ............................... 43/7 |
| 5,121,566 | A | * | 6/1992 | Barclay ............................... 43/7 |
| 5,553,649 | A | * | 9/1996 | Chisaka et al. ......... 160/168.1 R |
| 5,762,281 | A | * | 6/1998 | Foley ............................. 242/376 |
| 6,119,999 | A | * | 9/2000 | Fleishman .................... 248/489 |
| 6,155,526 | A | * | 12/2000 | Brown ........................... 248/303 |
| 7,523,910 | B2 | * | 4/2009 | Moran ........................... 248/317 |
| 7,883,069 | B2 | * | 2/2011 | Park et al. ..................... 248/328 |
| 2003/0122022 | A1 | * | 7/2003 | Pitcher ....................... 242/388.1 |
| 2005/0133771 | A1 | * | 6/2005 | Kohler ........................... 254/232 |
| 2005/0145522 | A1 | * | 7/2005 | Bloodworth et al. ......... 206/409 |
| 2011/0056057 | A1 | * | 3/2011 | Lin .............................. 24/68 D |
| 2014/0151486 | A1 | * | 6/2014 | Chen ............................. 242/379 |

* cited by examiner

*Primary Examiner* — Bradley Duckworth

(74) *Attorney, Agent, or Firm* — Roger N. Chauza, PC

(57) ABSTRACT

A loop adjuster having two parts that are rotatable with respect to each other. Each of the two parts has a slot therein that can be aligned to insert a loop of material therein. The two parts of the loop adjuster can then be rotated with respect to each other to impart a twist in the loop of material. The two parts of the loop adjuster are hollow so that the twisted part of the loop of material is located in the hollow part of the loop adjuster. The two slotted parts of the loop adjuster can be fabricated as hollow hemispheres that are snap locked together at an equator.

20 Claims, 2 Drawing Sheets

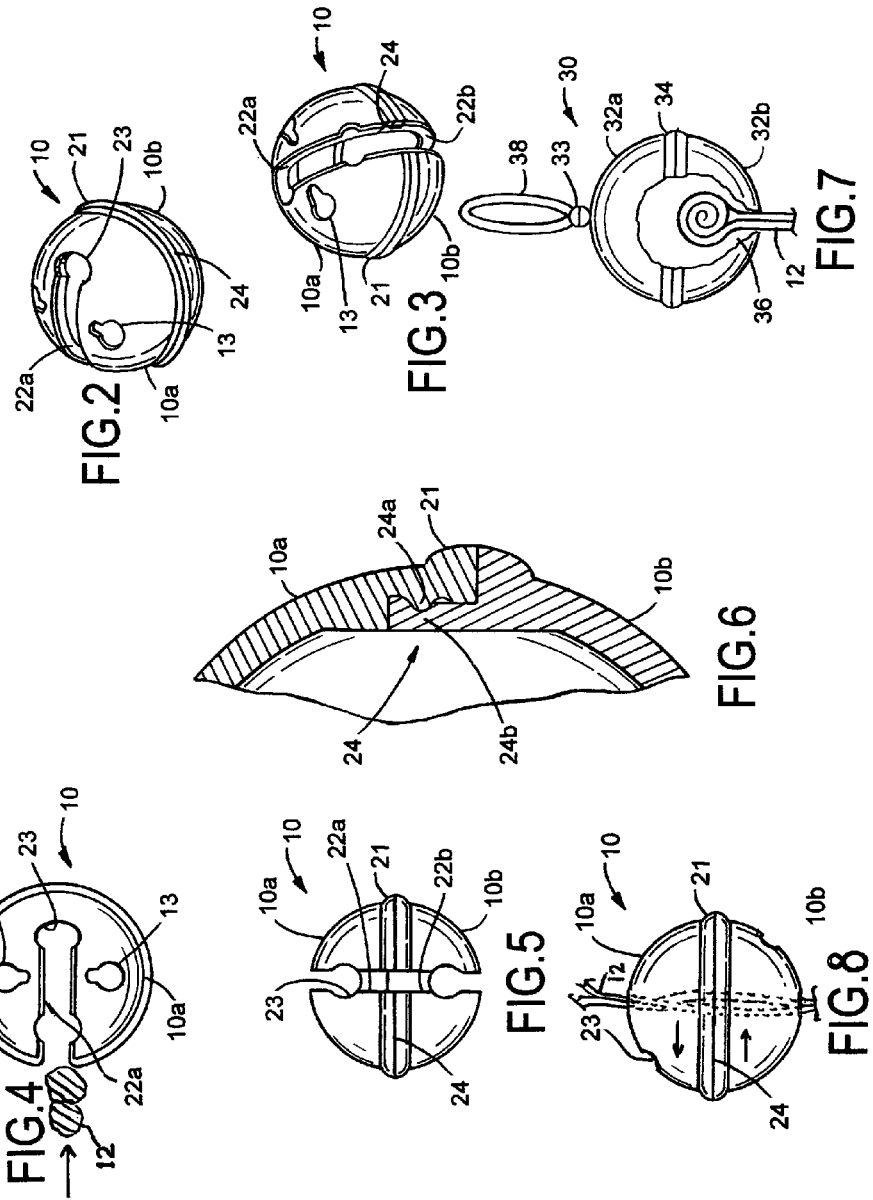

ROTATIONAL ADJUSTER FOR ITEM WITH A HANGING LOOP

RELATED APPLICATION

This non-provisional patent application claims the benefit of U.S. provisional application No. 61/744,334, filed Sep. 24, 2012.

TECHNICAL FIELD OF THE INVENTION

The present invention relates in general to items or ornaments that are hung by a loop, and more particularly to loop adjusters for rotating Christmas stockings in a desired rotational orientation.

BACKGROUND OF THE INVENTION

A number of different items are hung by a loop for display. Many of the items are not constructed so as to have the same shape or view when rotated about a vertical axis. For example, stuffed teddy bears and other stuffed animals often include a loop of material sewn to the back of the item so as to be hung from a hook, or the like, and displayed to customers. Christmas stockings are often constructed with a material loop at the top back edge to be hung from a mantel hanger. Model airplanes are often suspended from a ceiling by hooks and the like. Many other items are similarly constructed to be displayed from a ceiling hook or other type of hanger.

The hook by which items are suspended are not rotatable, and thus the item will rotate to self orient itself from the hook where the twist in the loop is the least. In other words, when suspended from the material loop, the item will rotate until the twist in the loop is minimal. However, this orientation may not be the one desired. This is especially troublesome when a number of items are to be displayed together and it is desired to have each item oriented in the same spatial orientation. For example, it may be desirable to orient stuffed animals so that each one faces the same direction, i.e., toward customers. Decorative pillows sewn with a loop can also be displayed in the same manner. It is also desirable to orient a number of Christmas stockings on respective mantel hangers so that each stocking presents a personal name thereon facing outward.

From the foregoing, a need exists for an adjuster that is easily attached to the loop of an item to adjust its orientation so that it faces in the desired direction. Another need exists for an adjuster that places a desired twist in the loop so that when the loop rotates to its stable orientation, the item faces in the desired direction.

SUMMARY OF THE INVENTION

In accordance with the principles and concepts of the invention, there is disclosed a loop adjuster constructed of two halves that are rotatable with respect to each other. A slot is formed in both halves of the adjuster for inserting the loop therein. One half of the adjuster is then rotated with respect to the other half to obtain the desired twist in the loop. The amount of twist imparted to the loop can be experimentally determined so that the item self orients in the desired direction.

In accordance with one feature of the invention, the loop adjuster is constructed as an ornamental sleigh bell or jingle bell that is slipped onto the Christmas stocking loop, and twisted. The ornamental jingle bell is preferably located next to the top portion of the Christmas stocking to provide ornamentation thereto, as well as the desired rotational orientation.

In accordance with another feature of the invention, the loop adjuster is constructed as two hollow halves that are snap locked together. The slot formed in each hollow half allows the loop to be inserted therein and captured when the top half of the loop adjuster is rotated with respect to the bottom half.

According to another feature of the invention, a first loop from which the loop adjuster is to be hung from a mantel hook, is attached by a swivel to the top hollow half of the loop adjuster. The first loop is mounted so it can turn freely relative to the top hollow half of the loop adjuster. The bottom half of the loop adjuster is slotted for slipping therein a second loop, i.e., that of the Christmas stocking. The excess top portion of the Christmas stocking loop is knotted or stuffed within the loop adjuster. With this arrangement, the Christmas stocking can be turned and left in any orientation by turning the first loop via the swivel to the desired position.

In accordance with one embodiment of the invention, disclosed is a loop adjuster adapted for use with an object attached to a loop of material. The loop adjuster includes a first portion and a second portion that are rotatable with respect to each other, and includes a respective slot formed in each of the first and second parts. The slot is for insertion therein of the loop of material of the object.

With regard to another embodiment of the invention, disclosed is loop adjuster adapted for use with an object attached to a loop of material, where the loop adjuster includes a first hemispherical and hollow part and a second hemispherical and hollow part. Further included is a snap lock mechanism for holding the first and second hemispherical parts together to form a hollow sphere. The first and second hemispherical parts each have formed therein a slot, the slots being alignable when either the first or second hemispherical part is rotated to achieve first positions. The slots are misaligned when either the first or second hemispherical part is rotated to achieve second positions. The slots of the first and second hemispherical parts are of a size to grip the loop of material so that when the first or second hemispherical part is rotated to the second positions, the loop of material twists in the hollow portion of the sphere and does not twist in the respective slots.

According to another embodiment of the invention, disclosed is a method of adjusting a twist in a loop of material attached to an object. The method includes inserting the loop of material into two vertical aligned slots of a loop adjuster. The one part of the loop adjuster is rotated with respect to another part of the loop adjuster so that one slot becomes misaligned with the other slot and a twist is imparted to the loop of material. The object can then be hung from a hanger by the loop of material with the loop adjuster attached to the loop of material to maintain the twist in the loop of material, whereby the object is suspended from the hanger with a desired rotational orientation.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIG. 2 is a side-top isometric view of a loop adjuster constructed according to an embodiment of the invention;

FIG. 3 is a front-top isometric view of the loop adjuster of FIG. 2;

FIG. 4 is a top view of the loop adjuster of FIG. 2;

FIG. 5 is a side view of the loop adjuster of FIG. 2;

FIG. 6 is a partial cross-sectional view of the loop adjuster of FIG. 2, illustrating the details of the snap lock mechanism;

FIG. 7 is a side view with a cut out portion of another embodiment of a loop adjuster constructed according to the invention; and FIG. 8 is a side view of the loop adjuster where the hemispheres have been rotated, thereby twisting the ornament loop, as shown in hidden lines.

DETAILED DESCRIPTION OF THE INVENTION

Figure 1:
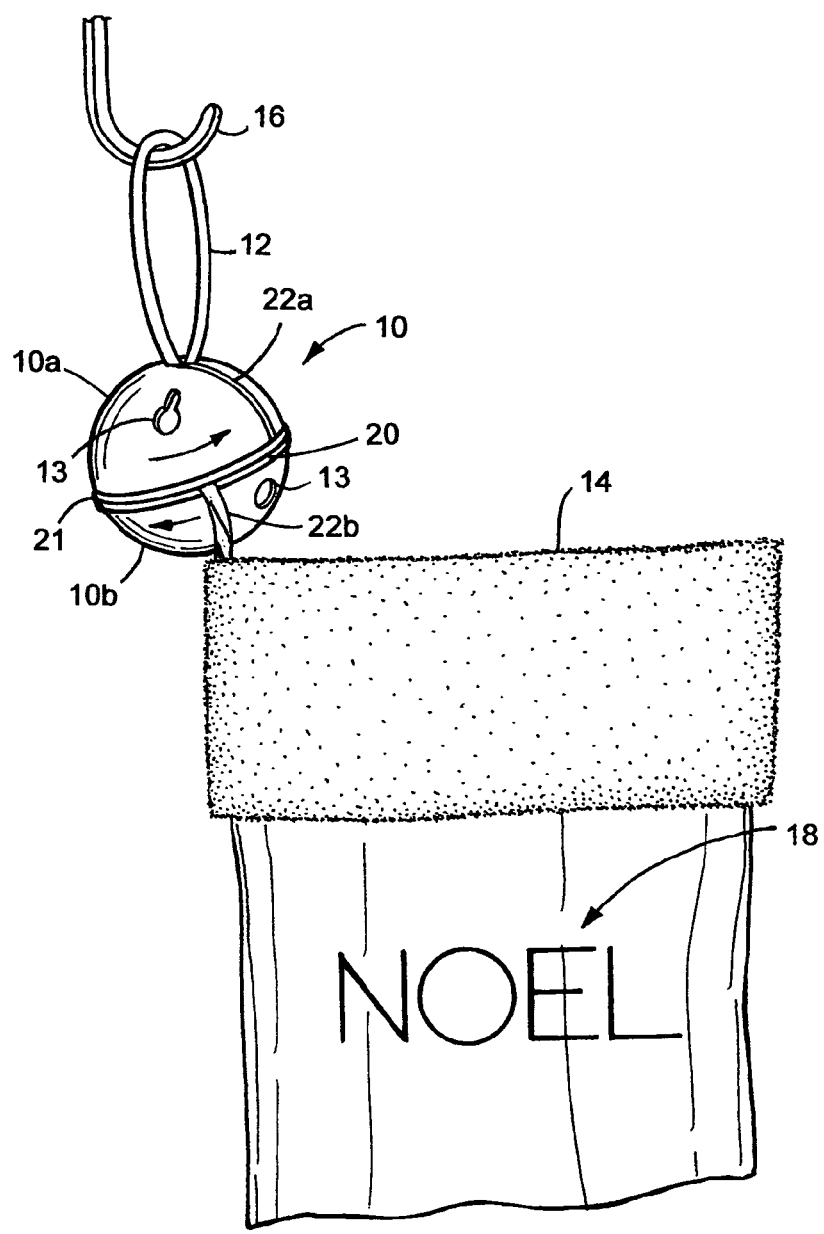
FIG. 1 is an isometric view of a loop adjuster for adjusting an orientation of a Christmas stocking.

With reference to FIG. 1, there is shown a loop adjuster 10 used to place a desired twist in the loop 12 of a Christmas stocking 14. Christmas stockings 14 are typically hung from hooks 16 that are attached or suspended from mantels, walls, furniture or other objects. Because the loops 12 are generally sewn to the Christmas stockings in a random manner, the stockings 14 naturally find a stable rotational orientation that is also random. Thus, when hanging a number of stockings 14 together, the stockings 14 find different orientations. It is often desirable that the stockings 14 are all oriented in the same manner to display the ornamentation 18 in the same direction. In the example, the Christmas stocking 14 is constructed with the ornamentation 18 which includes the word "NOEL." Other typical ornamentations of Christmas stockings 14 often include the names of children or grandchildren. In any event, an arrangement of Christmas stockings 14 all aligned in the same manner presents a pleasant and orderly display.

While the preferred embodiment of the invention is directed to a jingle bell, many other objects and shapes of loop adjusters are well within the ambit of those skilled in the art in view of the present disclosure. The loop adjuster 10 is preferably sufficiently hollow to allow the material of the loop 12 to be twisted inside of the spherical jingle bell 10. The loop adjuster 10 is constructed so as to be ornamental itself, i.e., as a jingle bell which is a typical Christmas ornament. The jingle bell loop adjuster 10 can be made with ornamental holes 13 therein to resemble a conventional jingle bell ornament.

The jingle bell loop adjuster 10 of the embodiment illustrated in FIG. 1 is constructed with two hollow hemispheres 10a and 10b. The two hemispheres 10a and 10b are attached together by a snap lock mechanism that allows the two parts to be rotated with respect to each other about the equator 20 of the composite sphere. A decorative band 21 is formed at the equator interface 20 between the top hollow hemisphere 10a and the bottom hollow hemisphere 10b. Also formed as part of the loop adjuster 10 is a vertical slot 22a in the top hemisphere 10a and a corresponding vertical slot 22b formed in the bottom hemisphere 10b. The slots 22a of the top hemisphere is formed with two decorative enlarged openings, one shown as numeral 23. Similarly, the slot 22b of the bottom hemisphere is formed with two decorative enlarged openings (not shown). As will be described in more detail below, the top part 10a and the bottom part 10b are rotated (as shown by the arrows) so that the slots 22a and 22b are aligned. Then, the loop 12 is inserted or otherwise wedged into the aligned slots 22a and 22b. Either the top part 10a or the bottom part 10b, or both parts 10a and 10b, are rotated to misalign the slots 22a and 22b. This places a twist in the loop 12 that remains as long as the top and bottom parts 10a and 10b remain rotated with respect to each other. Preferably, the top half 10a is rotated sufficiently to entirely misalign the slots 22a and 22b so that the loop 12 remains captured within the loop adjuster 10. The user of the loop adjuster 10 can experimentally determine which way to misalign the loop slots 22a and 22b, and to what extent, so that the stocking 14 maintains the desired orientation.

FIGS. 2-6 illustrate the various features of the jingle bell loop adjuster 10. As can be seen from FIGS. 3 and 4, the top and bottom vertical slots 22a and 22b are aligned. The slots 22a and 22b extend from a side surface well past the vertical pole center of the spherical loop adjuster 10. It is preferred, although not critical, that the loop 12 extend vertically in the center of the spherical loop adjuster so that it can be twisted when the hemispheres 10 and 10b are rotated with respect to each other. This is illustrated in FIG. 8. The width of the slots 22a and 22b should be such that when the loop 12 is inserted therein, the material of the loop cannot turn within the respective slots 22a and 22b. In other words, the side edges of the slots 22a and 22b should grip the material of the loop 12 sufficiently so that the only twisting of the loop 12 occurs within the hollow portion of the loop adjuster 10. In order to facilitate the gripping of the loop of material 12 by the slots 22a and 22b, the slots 22a and 22b can be formed so as to be narrowed radially inwardly. The slots 22a and 22b can also be formed with vertical serrations or teeth, or roughened areas, on the slot edges to facilitate gripping of the loop 12 of material therein. FIG. 5 illustrates the jingle bell loop adjuster 10 from a frontal side view.

FIG. 3 illustrates the snap fit arrangement 24 by which the top part 10a and the bottom part 10b are held together and allowed to rotate with respect to each other. The partial cross-sectional view of FIG. 6 illustrates in more detail the snap fit arrangement 24. The top part 10a includes a snap locking member has an annular rib 24a that engages within a corresponding annular recess 24b of the bottom part 10b. The top part 10a and the bottom part 10b can be snap locked together by simply pushing the parts together so that the annular snap lock members 24a and 24b yield sufficiently to allow engagement between the hooked edges 26. The slots 22a and 22b facilitate the yielding of either the top part 10a or the bottom part 10b, or both. The friction at the interface between the snap locking members 24a and 24b is sufficient to maintain the top part 10a and the bottom part 10b in the desired positions once rotated and released.

The loop adjuster 10 is preferably constructed of an plastic material using conventional injection molding techniques. The plastic can be coated with a metallic material to resemble a chrome or shiny jingle bell, or a colored jingle bell, using vacuum deposition of a thin coating of metal, or other coating technique. The plastic material from which the loop adjuster is constructed can be an ABS or other suitable plastic. As noted above, the loop adjuster 10 is molded as a hollow object to accommodate the twisted loop of material therein. A loop adjuster adapted for use with a conventional Christmas stocking is constructed as a 1.0 inch sphere, with a slot width of about 0.155 inch.

As noted above, the ornamental aspects of the loop adjuster 10 can be achieved in a number of ways other than a jingle bell. The loop adjuster 10 can be formed as an ornamental Christmas tree ball, or any other shaped ornamental object, as long as the interface between the top and bottom parts is annular. In any of the embodiments disclosed herein, the loop adjuster can be placed anywhere on the length of the loop of the object.

Another embodiment of a loop adjuster 30 is illustrated in FIG. 7. Here, the loop adjuster 30 is formed in the shape and appearance of a jingle bell, although it could be shaped as any other suitable ornament. The loop adjuster 30 is constructed in the same manner described above in connection with FIGS. 1-6 to include a top hollow hemisphere part 32*a* and a bottom hemisphere part 32*b* that are snap locked together at an equatorial band 34. The jingle bell loop adjuster 30 includes a swivel 33 attached to the top part 32*a* and a slot 36*b* formed in the bottom part. A top or first loop 38 is attached to the swivel 33. According to this embodiment, the first loop 38 of material is used to hang the loop adjuster 30 from a mantel hook, and a second loop 12 is connected to the item to be displayed, such as a Christmas stocking 14. Alternatively, the top part 32*a* could be constructed with a hole in the top thereof so that the first loop 38 can be threaded therethrough and tied into a knot inside the loop adjuster 30. The knotted loop 38 can thus be swivelled with respect to the top part 32*a*.

The Christmas stocking 14 is hung by the loop adjuster 30 from the mantel in the following manner. The top part 32*a* and the bottom part 32*b* of the loop adjuster 30 are separated at the snap lock mechanism. The middle section of the second loop 12 of the Christmas stocking 14 is inserted through the slot 36 of the bottom part 32*b* of the loop adjuster 30, and the remainder of the upper portion of the Christmas stocking loop 12 is stuffed into the hollow portion of the bottom part 32*b*. A knot can be tied in the Christmas stocking loop 12 to prevent the upper part thereof from being pulled out of the bottom part 32*b* of the loop adjuster 30. Next, the first loop 38 is attached to the swivel 33 of the top part 32*a*. If a mechanical swivel 33 is not used, the bottom portion of the first loop 38 is threaded through a hole formed in the top part 32*a* and knotted or rolled up therein. The top and bottom parts 32*a* and 32*b* of the loop adjuster 30 are then snap locked together. The loop adjuster 30 and the Christmas stocking 14 fastened thereto are lifted and suspended from a mantel hook by the first loop 38 that extends from the loop adjuster 30. Lastly, the first loop 38 is swivelled with respect to the top part 32*a* to achieve the desired orientation the Christmas stocking 14.

According to another embodiment, the loop adjuster can be constructed as a unitary item using a malleable material, such as folded sheet copper, formed with a vertical slot therein. Once the loop is inserted into the slot, the top and bottom parts are twisted in opposite directions until the correct orientation of the object is obtained. The copper sheet can be housed with an ornamental cover. Depending on the item to which the loop is attached, the loop can be constructed from many different types of materials.

While the preferred and other embodiments of the invention have been disclosed with reference to specific loop adjusters, and associated methods of construction thereof, it is to be understood that many changes in detail may be made as a matter of engineering choices without departing from the spirit and scope of the invention, as defined by the appended claims.

What is claimed is:

1. A loop adjuster adapted for use with an object attached to a loop of material, said loop adjuster comprising:
   a top part and a bottom part that are rotatable with respect to each other about a vertical axis, said top part adapted for being hung by a hanger; and
   an aperture formed in said bottom part, said aperture for insertion therein of the loop of material of the object, said aperture adapted for gripping the loop of material so that at least one said top part or said bottom part is rotated about said vertical axis until the object is rotated to a desired orientation.

2. The loop adjuster of claim 1, wherein said top part and said bottom part are constructed with circular snap locking mechanisms that allow rotation of the top part with respect to said bottom part.

3. The loop adjuster of claim 1, wherein said top part and said bottom part are each hollow, and wherein said aperture comprises a slot that is of a size that allows gripping of the loop of material to prevent rotation of the loop of material within the slot, but allows the loop material to be twisted within the hollow part of the loop adjuster.

4. The loop adjuster of claim 1, wherein said top part and said bottom part are each hemispherical shaped and hollow.

5. The loop adjuster of claim 4, wherein said top hemispherical part and said bottom hemispherical part each have an annular edge constructed with a snap locking mechanism.

6. The loop adjuster of claim 4, wherein said top hemispherical part and said bottom hemispherical part are shaped as an ornamental jingle bell when removably attached together.

7. The loop adjuster of claim 1, wherein said hanger comprises a looped end of said loop of material.

8. The loop adjuster of claim 1, further including in combination a Christmas stocking with the loop of material attached thereto, where said loop of material extends through said loop adjuster and out of an aperture formed in said top part.

9. The loop adjuster of claim 1, wherein said top part and said bottom part are constructed of a plastic material.

10. The loop adjuster of claim 1, further including a respective slot formed in each said top part and said bottom part, and wherein a portion of the loop of material of the object is inserted in each said slot, and when the top part is rotated with respect to said bottom part, the portion of the loop of material located within the loop adjuster is twisted to orient the object in a desired orientation.

11. The loop adjuster of claim 1, wherein said loop adjuster is hollow, and said hanger includes a swivel hanger attached to a top portion of said top part so that said loop adjuster can be hung, the loop of material of the object is inserted into the aperture of the bottom part and a remainder of an upper part of the loop of material is stuffed in the hollow loop adjuster, and when the swivel hanger of the loop adjuster is swiveled with respect to the top part, the object is oriented in a desired orientation.

12. A loop adjuster adapted for use with an object attached to a loop of material, said loop adjuster comprising:
   a top hemispherical and hollow part;
   a bottom hemispherical and hollow part;
   a snap lock mechanism for holding said top and bottom hemispherical parts together to form a hollow sphere, said snap lock mechanism adapted for allowing the top hemispherical part to rotate about a vertical axis with respect to said bottom hemispherical part;
   said top and bottom hemispherical parts each having formed therein a respective slot, the slots being alignable to form a common single elongated slot in said loop adjuster so that the loop of material can be laterally forced into the common slot without separating said top and bottom hemispherical parts, said loop of material is forced into said common elongated slot by moving the loop of material in a direction orthogonal to an axial axis of the loop of material, said slots are aligned when at least one said top or bottom hemispherical part is rotated to achieve a first position, and said slots are misaligned when at least one said top or bottom hemispherical part is rotated to achieve a second position; and
   the slots of the top and bottom hemispherical parts of a size to grip the loop of material so that when said top hemispherical part or bottom hemispherical part is rotated to the second positions, the loop of material twists in the hollow part of the sphere and does not twist in the respective slots.

13. The loop adjuster of claim 12, wherein said loop adjuster is constructed to resemble a jingle bell.

14. The loop adjuster of claim 13, further including in combination a Christmas stocking defining the object, and the loop of material is insertable into the common slot of the top and bottom hemispherical parts.

15. The loop adjuster of claim 12, wherein a first slot is formed in said top hemispherical part from a top thereof down to an annular edge thereof, and a second slot formed in said bottom hemispherical part from a bottom thereof up to an annular edge thereof.

16. The loop adjuster of claim 12, wherein said first hemispherical part and said second hemispherical part are identical images of each other when snap locked together.

17. A method of adjusting a twist in a loop of material attached to an object, comprising:
    rotating a first part of a loop adjuster with respect to a second part of the loop adjuster to align a slot in said first part with a slot in said second part;
    selecting a short length of the loop of material, where the short length of the loop of material has an axial axis;
    without separating said first and second parts, inserting the short length of the loop of material sideways, orthogonal to the axial axis of the short length of loop of material, into the two aligned slots of a loop adjuster until a first portion of the short length of the loop of material engages in the slot of the first part and until a second portion of the short length of the loop of material engages in the slot of the second part so that a middle portion of the short length of the loop of material exists between the engagement of the first and second portions of the loop of material with the respective slots, and an end of the loop of material extends outside said loop adjuster;
    manipulating said loop adjuster to cause relative rotation between said first part and said second part of the loop adjuster so that the slots become misaligned and a twist is imparted to the middle portion of the short length of the loop of material;
    hanging said loop adjuster by the end of the loop of material with the loop adjuster attached to the loop of material to maintain the twist in the middle portion of the short length of the loop of material; and
    whereby the object is suspended from the hanger with an orientation about the axial axis that is different than would be without the use of said loop adjuster.

18. The method of claim 17, further including inserting the loop of material into the aligned slots so that the first and second portions of the loop of material are grasped by respective edges of the aligned slots.

19. The method of claim 17, further including using a hollow loop adjuster and allowing the middle portion of the short length of the loop of material to be twisted in the hollow part of the loop adjuster.

20. The method of claim 17, further including manipulating the loop adjuster after the end of the loop of material is hung to cause relative rotation a second time between the first and second parts to thereby readjust the orientation of the object about a vertical axis so that the orientation thereof matches an orientation of another object.

* * * * *